March 20, 1962  A. D. HAMMER  3,025,947
PORTABLE LUNCH BOX
Filed Dec. 6, 1957  3 Sheets-Sheet 1
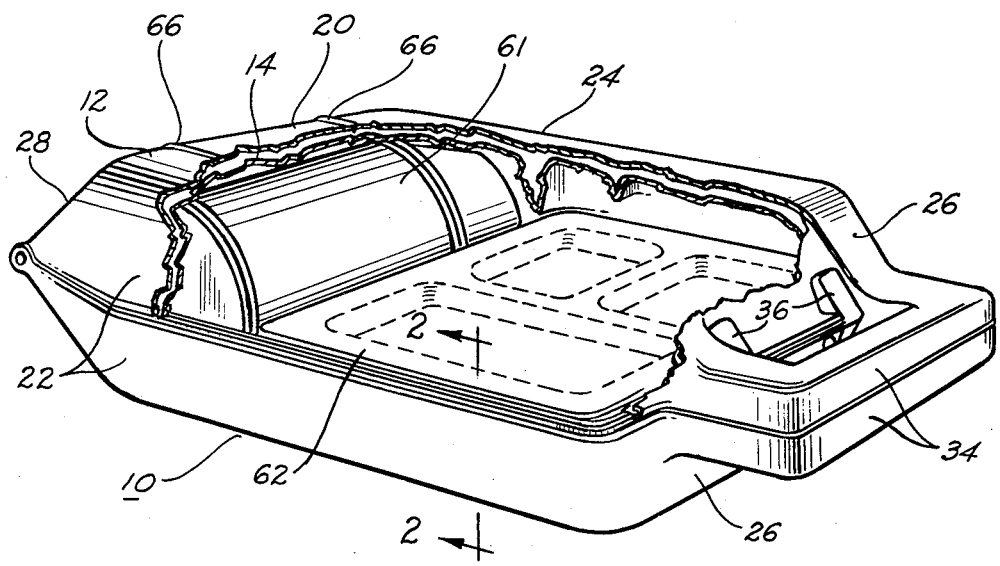
FIG_1
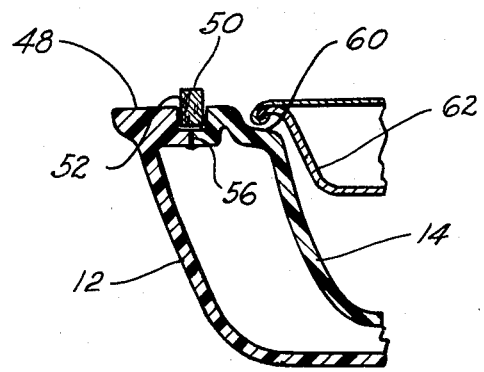
FIG_2
INVENTOR.
ALLAN HAMMER.
BY
John A. Young
ATTORNEY.

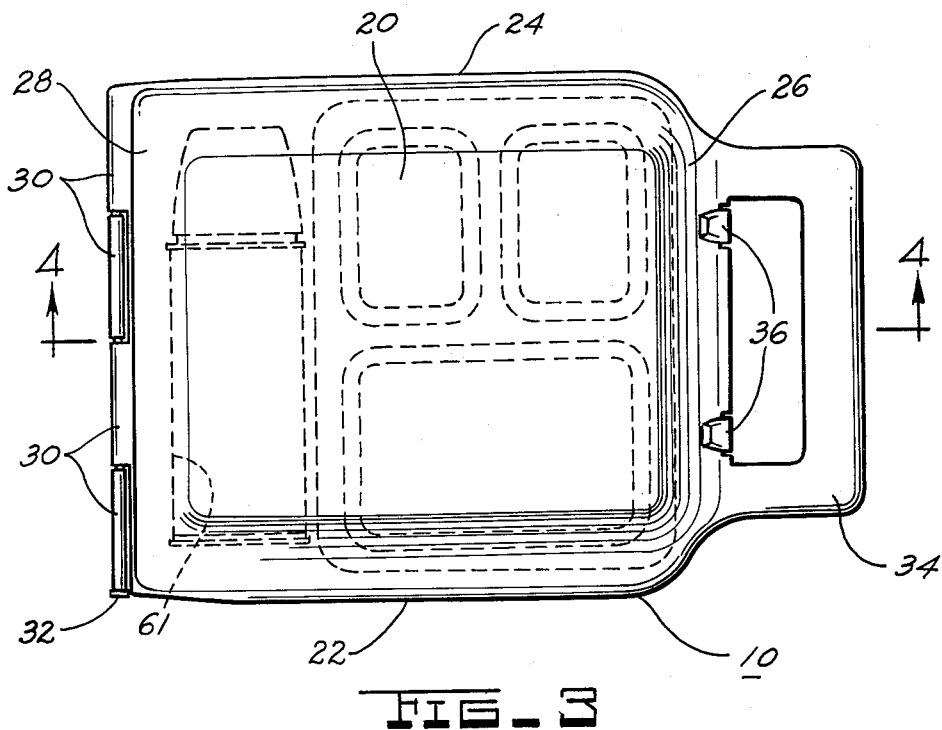
FIG_3
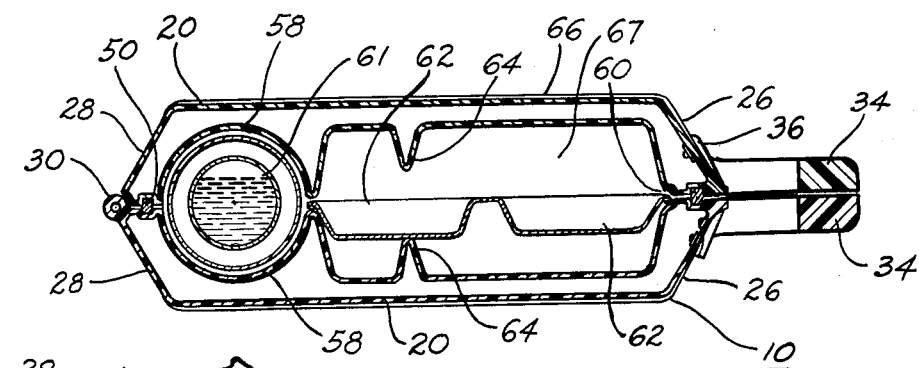
FIG_4
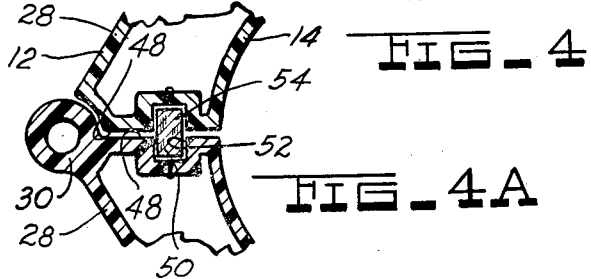
FIG_4A
INVENTOR.
ALLAN HAMMER.
BY
John A. Young
ATTORNEY.

March 20, 1962   A. D. HAMMER   3,025,947
PORTABLE LUNCH BOX
Filed Dec. 6, 1957   3 Sheets-Sheet 3
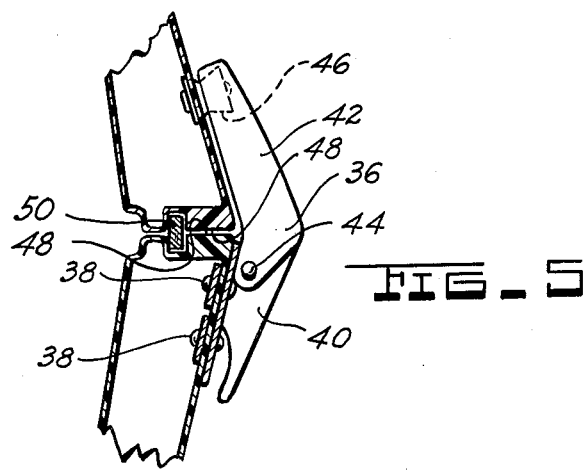
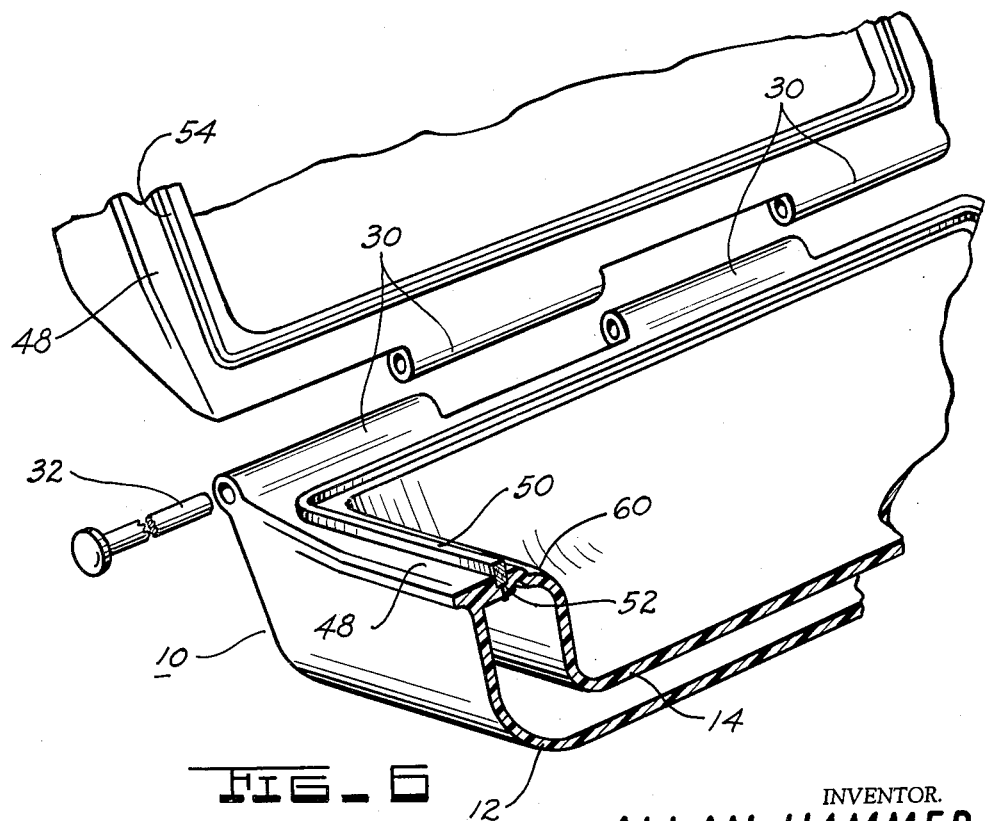
INVENTOR.
ALLAN HAMMER
BY John A. Young
ATTORNEY.

United States Patent Office 3,025,947
Patented Mar. 20, 1962

3,025,947
PORTABLE LUNCH BOX
Allan Dean Hammer, 5210 Sunnyfield Place,
South Bend, Ind.
Filed Dec. 6, 1957, Ser. No. 701,019
3 Claims. (Cl. 206—4)

This invention relates to a portable lunch box which is thermally insulated so as to be especially adapted for carrying frozen food trays of prepared foods which have been heated and are ready for consumption. The heated tray of food is kept in a warmed condition by the insulating action of the box. Obviously, the box is equally useful for preserving a chilled prepared lunch in a refrigerated state.

The trays of frozen food which are contemplated as being one of the main items of fare in the box are usually shallow disposable trays which have sectionalized portions packed with frozen servings which need only be heated prior to serving. There is generally included a foil covering as a part of the packaging. The construction of the tray itself forms no special part of the present invention nor does the original condition of the food, but it is an object of the invention to provide a thermally insulated portable lunch box which will be readily adapted for carrying heated, prepared dinners of the character described and storing them either in a heated or a chilled condition until a time for consuming them.

Among the various other objects of the invention is to provide a box construction of the utmost simplicity and manufacturability. I propose to do this by providing an insulated inner and outer shell, each of the shells being composed of symmetrical halves. The problem of manufacture and assembly is thus greatly simplified, and therefore cost is reduced to a minimum.

Another object of the invention is to provide a lightweight lunch box which is both attractive in appearance and utilizes with maximum efficiency its available volume for carrying food.

Also, a feature of the invention is that the box is washable and will not deteriorate by rusting or corroding.

Further than this, the box is durable and will give a long period of useful life during which time the user will have the benefit of heated meals which will contribute to the nutrition and taste of packed lunches.

In addition to serving the function of carrying the prepared, heated dinner the box may be further compartmentalized for including a Thermos bottle or other heat insulated container for liquids in a manner hereafter described.

Other objects and features of the invention will be described in combination with the following detailed description of a selected embodiment of the invention which proceeds with reference to the accompanying drawings, wherein:

FIGURE 1 is a perspective view of a lunch box with the outer and inner shells broken away to show the contents thereof;

FIGURE 2 is an enlarged fragmentary detail section view taken on line 2—2 of FIGURE 1;

FIGURE 3 is a top view of the box;

FIGURE 4 is a section view taken on line 4—4 of FIGURE 3;

FIGURE 4A is an enlarged fragmentary detail view of the hinge portion also shown in FIGURE 4;

FIGURE 5 is a detail view of the latching mechanism for closing the box; and

FIGURE 6 is a detail view of the hinge arrangement for holding the two box halves together.

The box, designated generally by reference numeral 10, comprises an outer shell 12 and an inner shell 14. The two shells may be of the same or similar material. For some applications a hard, durable shock-resistant plastic material may be selected for the outer shell material. The inner shell must have some resistance to heat as well as the necessary mechanical strength.

The outer shell 12 is made up of two identical portions 16 and 18 which may be made from the same mold or die cavity. In those instances where the shell is metallic then a stamping method is possible for manufacture. Each shell half comprises a flat surface 20 and inclined sides 22, 24, 26 and 28.

The shell portions of the box may be made from such plastic materials as polystyrene or cellulose acetate butyrate. In order to reduce the cost of manufacture and make large volume manufacture possible an injection type molding procedure may be followed.

The sides 28 have integrally formed therewith a series of apertured hinges 30 (FIGURE 6) which are interfitted and aligned, and a hinge pin 32 then passed through the aligned apertures of the hinges 30 to join the two outer shells together. A handle portion 34 is also formed integrally with the outer shells at side 26 so that when the box is closed the two handle portions 34 on the respective outer shells form a completed handle for carrying the box.

Two clasps 36 are used for locking the box closed. Each clasp is mounted to one of the shells by rivets 38 (FIGURE 5). The clasp is in effect a toggle with lever portions 40 and 42 which are pivoted together by a pin 44. A catch 46 is fixed to the outer shell of one of the box halves and the clasp is operated by lifting lever 40 and engaging or disengaging lever 42 with catch 46 and thereafter depressing lever 40 with the lever 42 in contact with catch 46 if it is desired to lock the box closed. A spring (not shown) is used to keep the lever 40 normally against the box to prevent accidental opening of the latch.

The mating edges 48 of the two outer shells are insulated by a strip of insulation material 50 which is received in a notched portion 52 of the one half and extends into a notch 54 of the other half.

The inner shell 14 of the box is of a more intricate shape than the outer shell. The inner shell is formed of identical halves and may be fused to the outer shell (when plastic materials are used) to complete each half section of the box. As shown in FIGURE 2, reference numeral 56 indicates the weldment of the two shells. This is accomplished, for example, by subjecting the mating edges to the action of a suitable solvent and then bonding the mating edges of the inner and outer shells thereby joining them together.

By joining the two shells in this manner a dead air space is provided between the two shells which serves to insulate the interior of the box while it is closed. The space between the inner shell 14 and outer shell 12 can be filled with insulation material if desired.

Each inner shell half comprises a semi-circular cross-section portion 58 (FIGURE 4) and a stepped portion 60 where the two halves are joined together. The semi-circular cross-section portion provides a suitable compartment for holding a Thermos bottle 61 and the stepped portion 60 acts as a confining groove for the outer edge of tray 62. Referring to FIGURE 4 it will be seen that the ribs 64 which form a part of the inner shell 12 provide added lateral support for the tray 62 so that the tray will not bend. The ribs also subdivide the interior of the inner shell 14 so that it can serve as a food tray with food portions contained in each subdivided section when the box is opened and lies flat.

The outer surface of shell 12 can be provided with protecting strips 66 to prevent scratching and marring of said outer surface.

When it comes time to consume the lunch the clasps 36 are undone and the box opened at its hinges.

The contents of the tray 62 which have been kept heated are then consumed in substantially the original warmed or chilled condition. The interior of compartment 67 not occupied by the tray can hold utensils or the like for eating the lunch. This unoccupied space is also available for supplementary foods such as sandwiches, etc.

The space between the inner and outer shells can be filled with insulation material if desired.

As described the box is extremely efficient and very simple to make consisting essentially of: duplicate parts of two inner and outer shells; a hinge pin; insulation strip; and two latches.

Moreover, it is designed to accommodate frozen food dinners which are ideally suited for quick preparation, are palatable for balanced nutritious lunches and can be carried to provide the main course of the lunch.

While a single illustrative embodiment of the invention has been disclosed it will be apparent that numerous modifications and revisions of the invention are possible without departing from the underlying principles of the invention. It is intended that such variations, revisions and applications of the invention as are reasonably expected from those skilled in the art will be included within the scope of the following claims.

I claim:
1. A lunch box adapted for carrying a shallow tray of heated prepared food and for maintaining the food content of said tray in a heated condition, said box comprising a first box half having an outer plastic shell which includes an integrally constructed handle portion along one edge, two spaced apart hinge portions also constructed integrally with said outer shell and disposed along the edge of said shell opposite said handle portion, said box half having an inner shell supported in spaced relation to the outer shell and connected thereto by means of a peripheral planar flange, a second box half which is constructed identically with said first box half and comprising inner and outer plastic shells of the same construction and dimension as the inner and outer shells respectively of said first box half, hinge-pin means received through the aligned spaced interfitting hinge portions of said first and second box halves respectively to hold said box halves together, said inner shells having opposed complementary recesses and said peripheral planar flanges having opposed peripheral grooves, said grooves being U-shaped in cross section and receiving a sealing gasket rectangular in cross section, one of said complementary recesses adapted to receive the edges of a frozen food tray whereby said tray is clamped and supported within said recesses when said halves are in closed position.

2. A lunch box structure in accordance with claim 1 including spaced clasp members secured to one of said box halves and having fasteners with the other box half to effect a drawing action between said box halves when said clasp members are releasably locked in place thereby drawing said box halves together and urging said complementary recesses together.

3. The box structure in accordance with claim 1 including semicircular cross section recesses extending the width of each of said inner shells and located to provide between said inner shells a cylindrical compartment defined by said inner shells when they are closed one over the other.

References Cited in the file of this patent
UNITED STATES PATENTS

| | | |
|---|---|---|
| 1,336,776 | Drinkwater | Apr. 13, 1920 |
| 1,831,663 | Hill | Nov. 10, 1931 |
| 2,222,428 | Boettcher | Nov. 19, 1940 |
| 2,339,580 | Park | Jan. 18, 1944 |
| 2,436,097 | Clarke | Feb. 17, 1948 |
| 2,457,043 | Histand | Dec. 21, 1948 |
| 2,555,788 | Donaldson | June 5, 1951 |
| 2,606,652 | Jaquette | Aug. 12, 1952 |
| 2,679,244 | Fucci | May 25, 1954 |
| 2,767,100 | Clarke | Oct. 16, 1956 |
| 2,768,718 | Hassid | Oct. 30, 1956 |

FOREIGN PATENTS

| | | |
|---|---|---|
| 506,538 | Canada | Oct. 12, 1954 |